United States Patent [19]
Andrews

[11] 3,809,175
[45]* May 7, 1974

[54] HEALTH, SURFACE, WATER AND/OR MATERIAL PROTECTIVE DEVICE

[76] Inventor: Peter Andrews, 190 Gebhardt Rd., Penfield, N.Y. 14526

[*] Notice: The portion of the term of this patent subsequent to July 6, 1988 has been disclaimed.

[22] Filed: Dec. 14, 1972

[21] Appl. No.: 315,174

Related U.S. Application Data

[60] Continuation-in-part of Ser. No. 94,793, Dec. 3, 1970, abandoned, which is a continuation-in-part of Ser. Nos. 532,831, Feb. 21, 1966, Pat. No. 3,669,204, and Ser. No. 750,094, Aug. 3, 1968, Pat. No. 3,590,937, which is a continuation-in-part of Ser. No. 508,625, Oct. 21, 1965, Pat. No. 3,396,810, which is a division of Ser. No. 288,159, June 17, 1963, abandoned.

[52] U.S. Cl. .............. 180/69.1, 159/16 R, 159/34, 165/44, 184/106
[51] Int. Cl. ............................................. B62d 25/20
[58] Field of Search ...... 180/69.1; 184/106; 165/44; 159/34, 16 R

[56] References Cited
UNITED STATES PATENTS

| | | | |
|---|---|---|---|
| 1,163,317 | 12/1915 | Brush | 180/69.1 |
| 2,618,351 | 11/1952 | Giacosa | 180/69.1 |
| 2,783,848 | 3/1957 | Beskid | 180/69.1 |
| 2,841,245 | 7/1958 | Colgan | 180/69.1 UX |
| 2,868,329 | 1/1959 | Phelps | 180/69.1 X |
| 2,899,019 | 8/1959 | Colgan | 180/69.1 UX |
| 2,931,453 | 4/1960 | Inglese | 180/69.1 |
| 3,396,810 | 8/1968 | Andrews | 180/69.1 |
| 3,590,937 | 7/1971 | Andrews | 180/69.1 |
| 3,669,204 | 6/1972 | Andrews | 180/69.1 |

Primary Examiner—David Schonberg
Assistant Examiner—Milton L. Smith

[57] ABSTRACT

A process and an entirely upstanding walled receptacle member of a subcombination apparatus which is removably secured to at least one portion of a motor vehicle of the race car, automobile or car, truck, bus, boat or monorail type, and accordingly having oil or fluid drippings retained therein. The process invention is substantially performed in a material and/or a receptacle portion of the subcombination apparatus. The receptacle, in one of its embodiments, having at least one separate material for at least retaining one portion of the oil or fluid which drips therein. The process being substantially for increasing the rate of oxidation and thickening and evaporation of the oil or fluid which is captured in at least one portion of at least one receptacle and/or at least one material retained therein. The oil or fluid leaks or drips from and/or into the motor vehicles having a defective oil or fluid gasket, seal and the like, the latter generally pertaining to a sliding and/or rotating shaft member thereof. The process invention substantially prevents the captured or dripped in fluid from being spilled, ejected or dumped substantially out of the receptacle and onto, for example, a roadway's, race track's, highway's (car, truck and/or bus) travelling surface. Thereby "summer icing" of the disclosed traveled surfaces and "viscous hydroplaning" of the motor vehicle's tires thereon and especially when the motor vehicle's are abruptly started, stopped, curving or curving in and out and/or travelling at a very high rate of speed.

32 Claims, 7 Drawing Figures

HEALTH, SURFACE, WATER AND/OR MATERIAL PROTECTIVE DEVICE

This application is a continuation-in-part of my copending application Ser. No. 94,793 filed Dec. 3, 1970 and now abandoned which is a continuation-in-part of copending application Ser. No. 532,831 filed Feb. 21, 1966 now U.S. Pat. No. 3,669,204 issued June 13, 1972 and Ser. No. 750,094 filed Aug. 3, 1968 which Ser. No. 750,094 application now U.S. Pat. No. 3,590,937 issued July 7, 1971 was a continuation-in-part application of Ser. No. 508,625 application filed Oct. 21, 1965 now U.S. Pat. No. 3,396,810 issued Aug. 13, 1968 which was a divisional of the parent application Ser. No. 288,159 filed June 17, 1963 which is now abandoned.

The process invention portion of this specification relates to and is in operative association with a motor vehicle, for example, in one of its embodiments with a car, race car, truck, and/or bus, to prevent the surface and/or material that is substantially under the motor vehicles from becoming fluid polluted, a slimy dangerous slippery surface for the motor vehicles to travel thereon especially at a high rate of speed, a disgustful sight, contaminated or impared surface by the disclosed dripping oil or fluid which is dripping from especially the cars, trucks, and buses. The fluid leaks and drips from various parts of the above mentioned three motor vehicles as, for example, when they are parked, standing, slowly moving, or at a high rate of speed on the highway's surface.

Fluid drip receiving receptacles, pans, trampoline, shelf-like, hinged pans and the like devices have previously been constructed and secured to a car, truck or bus motor vehicle to retain fluid which drips from thereunder but not one prior art oil or fluid drip pan device was removably secured under race cars, cars, trucks, and/or buses, in boats or under or in a monorail type of motor vehicle because the prior art devices were all designed to receive the dripping fluid only when the motor vehicle was parked in a garage, driveway or street and not one prior art hints or suggests to prevent oil or fluid drippings on the highways or even race tracks when the motor vehicle is in motion, so that lives will be saved, accidents prevented and the like as more fully disclosed in the objects of this specification, which objects were also substantially disclosed in may referenced copending applications.

Not one prior art fluid drip retaining device, that I am aware of, has suggested, hinted or disclosed that it was designed and arranged for my process invention to be performed therein, and which process increases the rate of oxidation and thickening and evaporation of the retained fluid and evaporation of surface, rain water and the like fluids which may be captured or retained in a portion of the subcombination apparatus invention.

Not one prior art device that I am aware of in whole or in part has removably secured, by at least one bolt or by at least one nut and bolt means, a fluid retaining receptacle to at least one or two cross members of a motor vehicle, to prevent the dripping oil or fluid from being deposited on the race track's or the highway's surface. And further to thereby provide a very strong and safe oil drip retaining skidplate or skidpan type of a receptacle device which cannot be easily torn off by water, air, ice or snow or stones, dirt, sod, and the like.

Not one of the prior art fluid drip retaining devices, that I am aware of suggests, hints or discloses any process for increasing the rate of oxidation and thickening and evaporation of the receptacle and/or material retained dripped in fluid by air which is a generated draft or air created by the motor vehicle when it is in forward drive motion, or uses catalyst, oil eating bacteria, air permeable material or Cab-O-Sil silane treated material in the receptacle portion of their device to thereby provide the objects, and great utility disclosed in this specification.

Three prior art fluid drip retaining patented devices were designed for specifically capturing the dripping oil or fluid, when the motor vehicle is parked in a garage or driveway and then uses the motor vehicle's generated draft of air for ejecting and dumping the receptacle retained oil or fluid directly on the roadway's or highway's surface, and thereby being for the direct opposite to the principal objects of this process and oil retaining receptacle invention.

The three prior art patented oil ejecting and dumping devices are in fact for the direct opposite to the great utility and objects of this invention because they will at least cost lives and create accidents on the highways and race tracks, would be outlawed for use on race cars, and thereby prevent the greatest utility on earth "saving lives at least on the highways and/or roadways", and would be in fact against President Richard M. Nixon's Total Environmental Pollution Control Policy. And as past President Lyndon B. Johnson stated: "The challenge we dare not disregard" . . . "unless we avert the slaughter on the highways, one out of every two Americans will be killed or seriously injured on our highways . . . "

The above fluid or oil ejecting and dumping prior art devices are respectively: W. G. Colgan, Ser. No. 2,841,245 filed May 10, 1956, and issued July 1, 1958; E. I. Phelps Ser. No. 2,868,329 filed July 17, 1956, and issued Jan. 13, 1959; and again W. G. Colgan Ser. No. 2,899,019 filed Nov. 4, 1957, and issued Aug. 11, 1959.

Another prior art oil drip pan device of J. Beskid, Ser. No. 2,783,848, Filed Aug. 13, 1954, and issued Mar. 5, 1957, and which device was filed before the previous three oil ejecting and dumping devices. Beskid provides a great disadvantage in that he forces cardboard in his container against the bottom of the oil pan sump or engine with spring force so that the container will not rattle. Beskid's great disadvantage is that his device will thereby create overheating of the lubricating oil therein and thus ruining the bearings of the car, truck or bus motor vehicle, especially when Beskid's device is attached to a racing car, or a car, truck or bus travelling at a high rate of speed on a race track's or a highway's surface.

The above first three prior art fluid drip devices are a fluid retaining receptacle when the motor vehicle is parked and are transformed into a fluid dumping, funnel, means when the motor vehicle is travelling at a fast rate of speed, for example, on a highway's surface.

The term "fluid" is used in this specification and claims to specifically designate an oil or grease mineral lubricant having hydrocarbons therein as well as non-mineral and/or synthetic lubricants that produces a dangerous, slippery and polluted surface when dripped or spilled on a race track, roadway and/or highway, which term "fluid" being understood as being fluid drippings (fluid which has dripped from at least one portion of the motor vehicle) and which drippings are being substantially retained or absorbed in the receptacle 1 or 62, or receptacle 1 and 62 and/or in the material 20, 6, 117, 118, 119, 120 or 121, the latter six materials being disclosed in applicant's copending Ser. No. 532,831 application.

CONDENSED OBJECTS OF MY INVENTION

A condensed version of the objects and utilities of this and other inventions disclosed in this application are: (1) Saving lives on the highways. (2) preventing accidents and personal injury, accordingly, to public on the highways. (3) Preserving the public's or one's health through at least one less portion of air pollution. (4) Saving money, at least $35.00 to $75.00 for motor vehicle fluid dripping owners. (5) Saving millions of dollars for the cities, state and federal government combined. (6) Preventing an inside surface of a motor boat from being fluid polluted, preventing substantially a fire hazard in the bilge of the boat, by even adding a bilge cleaner and/or detergent to the receptacle and/or material retained therein. (7) Preventing an inside surface of a momorail motor vehicle from being fluid polluted and fire hazardous. (8) Preventing a race car motor vehicle from being excluded from a race on a race track. (9) Preserving friendly relations between the motoring public, neighbors, friends, and delivery truck drivers and owners with customers, which customers do not allow the fluid dripping trucks on their driveways, as in Hollywood, for example. (10) Providing a minimum of expense to the motor vehicle dripping fluid public by buying and mounting the apparatus portion of this invention to their vehicle by use of available holes, bolt, and/or bolt and nut means on the motor vehicle. (11) Preventing water of, for example, a river, pond, lake and/or coastal waterways from being fluid polluted as when water and fluid or even an emulsion of water, bilge cleaner and detergent, and fluid are pumped or dumped out of a boat.

OBJECTS OF MY INVENTION

The most important object of my invention is to save lives and prevent accidents on the highways; prevent further pollution of the air we breathe and save money for the government and the public by preventing defective oil seal replacement and less maintenance due to a reduced volume of fluid in the receptacle portion of the apparatus and/or material retained therein.

Another principal object of my invention is to generally prevent the motor vehicular travelled roadway's or highway's surface, from becoming a "high surface tension surface" towards moisture, water or rain by preventing the highway and race track type of motor vehicle's fluid drippings from substantially being deposited or even spilled, ejected or dumped onto the, for example, highway's surface, substantially from a receptacle portion of the apparatus, especially when the motor vehicle is abruptly started, stopped, curving or by the motor vehicle's generated draft or air when the motor vehicle is travelling at a high rate of speed.

And another principal object of my invention is to prevent the roadway's or highway's surface from becoming a very slimy "ice-like" slippery dangerous motor vehicular travelled surface, and especially when moisture or rain floats on at least some of the dripped fluid on the highway.

Another important principal object of my invention is to have the process portion thereof performed substantially in at least one portion of a receptacle and/or in a separate material retained therein. The process for increasing the rate of oxidation and thickening and evaporation of the captured and retained, receptacle and/or material retained therein, fluid is substantially accomplished by utilizing the motor vehicular generated draft of cold, warm, hot or arid air; solid or liquid for the fluid, catalyst means; fluid or oil eating bacteria means; or use of heat directly or indirectly from the exhaust system.

A yet another principal object of my invention is to provide, place, or imbue an oil eating bacteria and/or a catalyst or catalytic chemical means or a fluid thickening agent, for example, Paratac and/or Cab-O-Sil into at least one fluid retaining portion of a receptacle portion of the apparatus and/or a separate material retained therein, for substantially reducing the captured, or retained fluid therein to a reduced volume and/or thickened state, even when the dripped in hydrocarbon mineral fluid is accompanied by rain water, slush, surface water, and the like.

Another further principal object of my invention is to have a separate material, pad or mat, or having a separate packaged material which is partitioned, sandwiched and the like, retained in at least one portion of fluid retaining receptacle portion of the apparatus for retaining, absorbing and/or substantially further preventing the captured or retained fluid from being spilled, splashed out, or being air ejected or dumped out onto the highway's surface, especially if at least one or the entire top wall portion of the material and/or the receptacle itself is also bezel topped, for example, as is substantially a bed pan and the like, and if the motor vehicle is parked out of level; is inclining or reclining; is abruptly started, stopped or curving; and is travelling, for example, at a high rate of speed on a highway, race track, on trestles or in the water, whereby the latter two are each for an elevated monorail and a boat being further specific motor vehicles. The separate material being further a fluid absorbent open cell "Scott" foam or at least one that will effeciently retain and/or absorb the oil or fluid therein, as for example, "Silanox" treated Cab-O-Sil material. It is preferred to have a generated draft or air flow draftingly into and out of the material and/or receptacle as when the motor vehicle is travelling at a high rate of speed on a highway, for example. "Scott" foam having "Silanox" being a Cab-O-Sil, silane-treated, material whereby oil will be absorbed therein but moisture or water will be generally repelled.

Another object of my invention is to have the above mentioned separate material as a separate packaged partitioned sandwiched one, a bagged bezel-topped partitioned material which has an integral fluid impermeable outer skin as in a foamed-in-place material which is adhesively retained in at least one portion of the receptacle and which material, disclosed package or any portion thereof being disposable, washable and reusable, rechargeable with earth, garden soil, catalyst means, oil eating bacteria means, fluid thickening agent means, oil absorbing and/or a porous material means, as desired, so that at least one step of the process whereby dehydration and reducing the fluid's volume is again efficiently and effectively carried out substantially in a receptacle portion of the subcombination apparatus device and/or material or materials retained therein.

Another further object of my invention is to provide a fluid retaining receptacle in the apparatus which is secured by at least one safe means to the motor vehicle and yet which apparatus is of a safe, solid, cheap structure to buy, secure and maintain, in that the securing thereof to a motor vehicle is accomplished without drilling any holes, adding supports or hangers, or without using other bolt and/or hole means other than that which is actually accessible or available or as being inserted by the motor vehicle manufacturer, especially in the cross, frame, member, as are seat belt anchoring holes, for example, as is later generally disclosed in this specification.

A still another principal object of my invention is to capture and retain the fluid drippings which are substantially retained in a separate material which is retained in a receptacle for at least preventing further pollution of the air we breathe, saving millions of dollars for the state and federal government combined and yet enable the motor vehicle owner to save money, because it did cost $35.00 to $75.00, but now it will cost at least $40.00 to take an automatic transmission apart to replace a 75 cent fluid leaking seal and at least $85.00 to additionally replace also the rear engine crankshaft fluid seal, and at least $20.00 to $30.00 additionally for a front crankshaft seal replacement.

And another principal object of my invention is to save lives and prevent accidents on a race track and also prevent a racing car from being excluded from, for example, the 500 mile Memorial Day Race at Indianapolis, by securing my subcombination apparatus invention to the underside of the motor vehicle even before any fluid does drip and/or is, for example, centrifugally thrown out by a rotating shaft means, since any showing of fluid deposit from the racing vehicle results in automatic exclusion from the race, at any time thereof.

Still another important object of my invention is to bring it to the attention of motor vehicles, for example, racing car, car, truck and bus manufacturer, and city, state and federal authorities that my invention should become standard, auxiliary, optional, optional extra or an accessory equipment thereof as are air bags, exhaust pollution control devices, etc.

A yet another important object of my invention is to further increase the rate of oxidation and thickening of the fluid retained in at least one portion of fluid thickening agents or means, for the retained fluid, which agents are inorganic catalyst, Paratac, Cab-O-Sil, oil eating bacteria and the like being subjected to at least one portion of the heat from the motor vehicle's exhaust system. Thereby exhaust heat convection means, for example, being used to further increase the temperature of the retained fluid for substantially increasing its rate of oxidation and thickening as well as dehydrating it to at least one reduced volume portion substantially in a material and/or a receptacle portion of the apparatus.

A still very important principal object of my invention is to increase the rate of oxidation and thickening of the retained fluid in at least one portion of the apparatus having a receptacle and at the same time still indirectly cool, by convection, the lubricating oil in the crankcase oil pan sump and/or the automatic transmission fluid sump by a draft of air which is presently drafting against at least one portion of the lowest underside wall portion of the disclosed sumps, and which air is generated by the forward drive motion of the motor vehicle, particularly when the vehicle is travelling in hot weather at high rates of motor vehicle speeds on a highway, for example.

And a still further object of my invention is to have at least the bottom wall of the crankcase oil pan sump in a corrugated shape, wave form, finned shaped, bossed shaped, and/or having a separate material which automatically provides a spaced relation to the oil pan sump's outer bottom wall. A motor vehicle generated draft of air is thereby allowed to flow against at least one outer bottom wall portion of the oil pan sump, regardless of the force or position or arrangement the material retained in the apparatus will generally assume thereagainst.

And yet a still further object of my invention is to create a minimum of expense for motor vehicle transporting or carrying ferry boat owners through less maintenance in that the motor vehicle's fluid dripping created spots or puddles of fluid are substantially prevented on the motor vehicle's parking surfaces, generally in the disclosed boat, especially if there is a separate material in the receptacle having a catalyst, Paratac, Cab-O-Sil, Silanox, napthnate, oil eating bacteria fluid thickening agent or means and the like in the receptacle and/or material retained therein.

A yet further object of my invention is to create a minimum of expense for fluid dripping motor vehicle owners by reusing the supporting and receptacle portion of the apparatus by having only the separate material retained in at least one portion of the receptacle or having a separate fluid retaining nestable receptacle therein which has the separate fluid absorbent and/or retaining material retained therein. Accordingly, the material and/or nestable receptacle units will be disposable as a unit when its fluid saturation point has been reached or even exceeded, even if there is additionally, a catalyst or oil eating bacteria means for the retained fluid in the nestable and/or disposable units. Thereby, the receptacle portion of the apparatus need not be fluid impermeable since the nestable receptacle will be, accordingly.

A still yet further object of my invention, whereby a minimum of expense is further made possible for fluid dripping motor vehicle owners is by having the separate material which is retained in at least one portion of the receptacle portion of the apparatus, be cleanable and/or washable and thereby is reusable, as is also the separate nestable receptacle, which is also washable and reusable along with any separate material retained therein, even if the retained material is a fluid absorbent and/or retaining and/or air permeable partitioned material.

A still further additional object of my invention is to increase the rate of oxidation and thickening and evaporation of the fluid retained in the fluid retaining receptacle portion of the apparatus by inserting or piping an oil thickening agent, catalyst or chemical acting catalyst means, for example, napthnate and the like, therein. Paratac and/or Cab-O-Sil of the treated and/or untreated (with silane) that may also be inserted in the material and/or the nestable receptacle. Treated Cab-O-Sil which is super hydrophilic treated Cab-O-Sil having its surface silane treated of the ST-1 and/or ST- 2-0 grade may also be used in at least one portion of the receptacle and/or a material retained substantially in the receptacle.

A further important object of my invention is to reduce the expense of manufacturing handling, packaging, shipping and installation of the fluid retaining apparatus as a whole, to a motor vehicle, by using accessible bolt securing means, accessible bore means and/or having special bore means already provided therein, for at least one portion of at least one supporting bracket or hanger portion of the apparatus, as are, for example, seat belt anchoring bolt insertion bore means, which are inserted in the body, floor or frame by motor vehicle manufacturers. Bolts, lock washers and nut supporting means for at least one portion of the apparatus may also be supplied or inserted in the bore means and/or with the motor vehicle, accordingly.

A yet another important object of my invention is to prevent the dripped and captured fluid from being dumped, ejected, washed or floated out of its fluid retaining receptacle and/or material retained in the receptable by surface or rain water by having the material retained in an entirely walled and/or bezeled fluid impermeable receptacle. The receptacle may be partially or entirely bezeled as desired. And a yet further object of my invention is to prevent the water of ponds, rivers, lakes, and coastal areas and the like from being polluted by the oil or fluid that is presently dripping from at least one portion of an inboard motor of a boat, be it substantially from the oil pan, transmission and the like of the motor, as a whole. Dripping oil or fluid, for example, is generally pumped or washed out of the boat and into the river, pond, lake, ocean or the coastal portion thereof, and thereby polluting at least one portion of the water. The subcombination apparatus, as a whole, or at least one portion of the device may be placed or removably secured, even adhesively, to at least one portion of the motor supporting structure, boat's structure, or any combination thereof, and yet be under the dripping fluid, or at least one portion of the receptacle portion of the apparatus may be removably secured directly to the motor, motor supports and the like as deemed necessary or desired, or by at least one bolt means in a tapped hole or by at least one bolt and nut means, as desired. Boat bilge's fire hazard and fluid pollution is generally prevented.

These and other objects and advantages will become more apparent in the course of the following description in which the accompanying drawings form a part thereof.

DETAILED DESCRIPTION OF THE INVENTION

Figures 1, 2, 3, 4, 5, 6, 7:
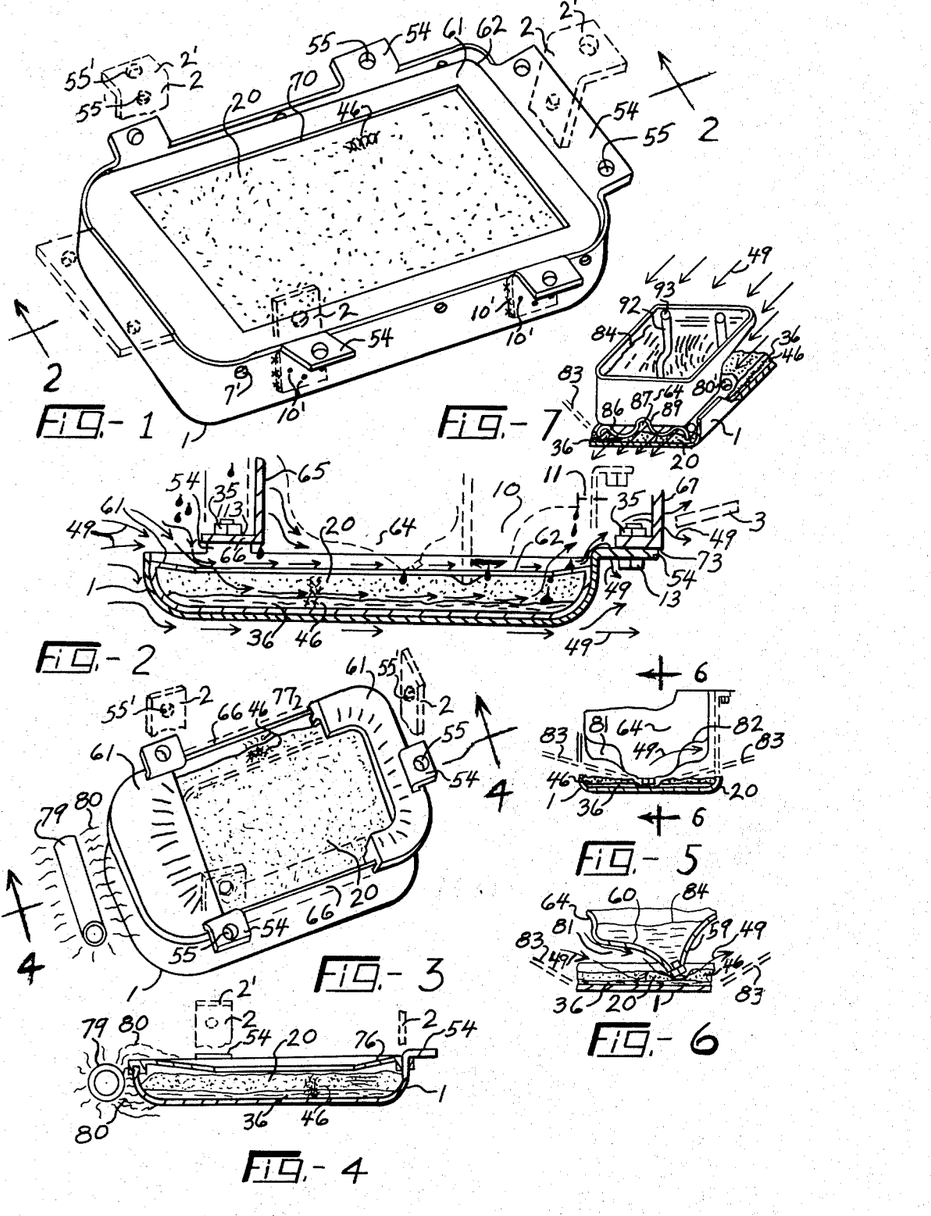
FIG. 1 is an isometric top view of a generally bezeled and lowered top or covered subcombination of substantially the subcombination apparatus shown in FIG. 1 of copending application Ser. Nos. 750,094; 94,793 and 508,625.
FIG. 2 is generally a sectional view of the apparatus taken along sectional line 2—2 of the FIG. 1.
FIG. 3 is an isometric top view of another embodiment of a partially or entirely bezel topped subcombination located close to a portion of the motor vehicle's exhaust system, if the pipe is so located.
FIG. 4 is sectional view taken along sectional line 4—4 of FIG. 3 apparatus and pipe portion of the motor vehicle's exhaust system.
FIG. 5 is a front view of a specially designed crankcase oil pan sump having a corrugated bottom wall with a material retained in receptacle 1 against the lower portion of the corrugations.
FIG. 6 is a sectional view taken along sectional line 6—6 of FIG. 5.
FIG. 7 is a front view of a separate corrugated air spacing means for an apparatus device, pan or trampoline type as desired.

The subcombination apparatus which is substantially shown in FIGS. 1 and 3 will be generally designated in this specification as the apparatus.

FIG. 1 shows a fluid impermeable trough-like receptacle 1 having a bottom wall and integral rectilinear side and end wall portions which merge into corner portions which integrally and fluid impermeably connect adjacent side portions together. The view further shows at least one side wall having an integral hanger means 2 having an end 2' which is at an angle to the upstanding portion of hanger 2. The end 2' having an opening 55' which is used for removably securing end 2' to at least one portion to the transmission, as shown in FIG. 1 of, for example, copending application Ser. No. 750,094 with available bolt securing means 13, and another plain ended hanger means 2 is also shown secured to the flange of, for example, the bell housing 10, also using accessible or available bolt 13 means in the, Ser. No. 750,094, FIG. 1, drawing.

FIG. 1 further shows substantially the receptacle 1 member and nut 35 portion of the apparatus having integral ears or brackets 54 which have at least one bolt 13, shown in FIG. 2, receiving opening 55 through its outwardly formed end. The receptacle 1 has a separate fluid retaining bezel-like 61 receptacle 62 retained therein, and which receptacle having a fluid permeable top surface or which receptacle having at least one opening 70 in its upper top surface. Material 20 is also shown retained in receptacle 62, and the material 20 may also be a catalyst, or a fluid eating bacteria placed, charged or imbued therein, as well as having Paratac and/or treated or untreated Cab-O-Sil therein accordingly.

The treated Cab-O-Sil, for example, now being called Silanox which is a trademark for hydrophobic fumed silicon dioxide from the Cabot Corporation. Silanox provides exceptional water repelency and yet will readily absorb the oil and/or grease drippings of the motor vehicles. Thereby environmental damage or at least the highway's, race track's motor vehicle used surface as well as at least some sea and/or inland waters river, pond, lake and/or coastal regions are substantially prevented from being oil or fluid polluted, the latter from boats where the dripped in the boat oil or fluid contaminated interior is cleaned, pumped or dumped overboard as by use of water and/or oil cleaning fluids, oil absorbing powders and the like known to persons skilled in the art.

When Silanox - treated absorption agents are employed on, for example, any, or any desired combination of material, 6, 20, 117, 118, 119, 120 or 121, or even a fibered, wood, sand, virmiculite, asbestos, cardboard, partitioned, straw, waste paper and the like, for example, materials, then the Silanox treated material retained in the receptacle 1 and/or 62 will selectively reject water, moisture or dew but still absorb oil or fluid drippings. When the above mentioned receptacle 1 and/or 62 retained material or any retained material mentioned or referenced in this specification becomes water-soaked, then the materials will be inhibited from absorbing oil or fluid drippings. Prior treatment, of the above disclosed materials as well as, for example, an open or closed cell Scott-Foam material, with Silanox would equip the materials with super-hydrophobicity, insuring that the bulk of the receptacle 1 and/or 62 retained material would remain moisture or water dry and thereby be available and ready for absorption of the oil or fluid drippings on contact therewith.

Treated Cab-O-Sil is a super hydrophobic treated Cab-O-Sil having a silane-treated surface.

The FIG. 1 view also shows in dashed line outline where the brackets 54 are transformed into hanger 2 means having integrally formed ends 2' thereon for reaching up, for example, to the crankcase oil pan flange accessible or available bolt 13 means, not shown, but is partially shown in dashed line outline in FIGS. 2 and 5 and which bolt 13 means are shown in copending application Ser. No. 508,624, in FIG. 2 thereof, as also disclosed in copending application Ser. No. 750,094.

FIG. 2 shows a sectional view of receptacle 1 taken along sectional line 2—2 of FIG. 1 and also shows the separate receptacle 62 with material 20 therein. For simplification, the material 20 substantially represents all the material disclosed in this specification. The view shows an integral rear bracket or ear 54 rigidly secured to an underside 73 portion of a cross member 67 portion of the motor vehicle's frame, for example, by use of at least one available opening 113 (not shown) but is under the nut 35 or bolt 13 or accordingly a separate bolt 13 and nut 35 means. The forward brackets or ears 54, are on each side of receptacle 1, as shown rigidly secured to an underside portion 66 of the forward cross member 65, of the motor vehicle's frame, using here also the preinserted openings 113 and/or available bolt means 13 or a separate bolt 13 and nut 35 means. At least one cross member 65 and/or cross member 67 is generally on a motor vehicle. The openings 113 disclosed above, for example, could be pre-inserted by the motor vehicle manufacturer, as are, for example, seat belt bolt anchoring openings in the floor of the vehicle. It should be noted that the forward end of the receptacle 1 is extended, if so desired, so that the receptable 1 will catch dripping fluid from the front motor shaft seal, not shown, and/or the forward cross member 65 portion of the frame. And also so that a generated draft of air, one step in a particular specifically claimed portion of this invention, shown by arrow 49 means, will enter over the forward wall portion of receptacle 1, above and through at least one portion of the material 20, over and against at least one portion of the fluid 36 retained therein and existing out over the rear wall portion of receptacle 1. At least one portion of the outer bottom wall portion 64 of the crankcase oil pan sump must be in spaced relation from the material 20, in receptacle 1 or 62, so that the lubricating oil therein will be indirectly cooled, by connection, of some of the oil's heat into the generated draft of air which is created when the motor vehicle is in forward drive motion, especially at high highway and/or race track speeds. Thereby, here the lubricating oil's temperature is not increased to the point that proper lubrication of the bearings of the crankshaft and the like is impaired by breakdown of oil film since one of the oil's inherent duties or functions of cooling at least one of the motor vehicle's bearings is thereby not impaired, especially at high or very high motor vehicle speeds. Also, the rate of, oxidation and thickening of the lubricating oil and the corrosive acid buildup is not increased in the oil pan sump when the temperature of the oil is maintained at a lower temperature by a motor vehicle's generated draft of air cooling of the oil pan sump's outer bottom walls, which air cooling is a designed function created by the vehicle manufacturer, unless there is an internal cooling of the oil by water piped means for the radiator, as in at least one is not most or all of the present automatic transmissions oil cooling systems. Only then could the bottom of the oil pan sump could be abutted against and be generally imbedded into the material 20, by further using a flexible resiliently secured member 83 partially shown in dashed line outline and is disclosed in FIGS. 5 and 6. At least one known prior art oil pan sump has its oil sumps bottom wall corrugated for additional air cooling of the oil therein.

The large rear bracket 54 shown in FIG. 1, may also be removably secured by bolt 13 or by bolt 13 and nut means 35 to the front cross member 65, to the flange 66, to provide greater safety, as is a skidpan or skidplate, and also prevent undue water flooding of the receptacle 1. Accordingly the receptacle 1 would be removably secured 180° from that which is shown in FIGS. 1 and 2, for example. The large, now front bracket 54, may also have its forward end edge portion extend beyond the forward edge portion of flange 66 so that fluid or oil drippings, shown in tear drop shape in FIG. 2, will be guided into the receptacle 1, as does the bezel 61, with or without a dished down surface 76 of FIG. 3 as shown in FIG. 14.

It is also very desireable to use the large rear bracket 54 which is to be removably secured to the cross member 67 of the motor vehicle's frame. The front, dashed line large bracket 54 which is shown in FIG. 1 or the two front side ears 54 are also to be used as desired, for removably securing the receptacle 1 to the front cross member 65 of the motor vehicle's frame since this is now substantially a skidpan or skidplate receptacle 1 and is thereby a very solid, and safe, and generally tear-off proof embodiment portion of especially the subcombination portion of the apparatus invention, for at least saving lives etc.

FIG. 3 shows receptacle 1 having a front and rear bezel-like members 61 integrally and cappingly sealed on the top edge of the front and rear walls of receptacle 1 and partially along the side walls also. The dashed line area 77 indicates that the bezeled structure 66 may be carried entirely around the top of the receptacle 1 walls, if so desired. It should be noted that when the large forward extending, ended bezel 61 of receptacle 1 and/or receptacle 62 shown in FIGS. 2 and 3 is under and extends beyond the forward end of the cross member 65, then the dripping fluid or oil will still be generally caught and retained in the receptacle 1, of FIGS. 2 and 3. And yet the generated draft of air 49 would be guided and not altogether be blocked off, if so desired, as shown in FIG. 2. The FIG. 3 structure is still very desireable even if the draft of air 49 is blocked off, since proper air cooling of the oil pan sump's bottom wall may still generally be obtained by other paths found by the air 49 into receptacle 1 and yet direct front end flooding of the receptacle 1, disclosed in FIG. 2, shown in FIG. 2 and also shown in FIGS. 3 and 4 by surface water, slush, debris and the like is substantially prevented by the large forward extending end of bezel 61 portion, as is the function of the forward extended, not shown, end of the bracket 54, disclosed in FIG. 2.

The FIG. 3 shows a section of the motor vehicle's exhaust pipe 79 located close or adjacent to a wall portion of the receptacle 1. This is desireable because some of the heat 80 waves, from the pipe 79, will be transmitted to the receptacle 1 wall and then to the fluid 36 as shown in FIG. 4. The process step of utilizing heat from the exhaust system will raise the temperature of the retained fluid 36 and thereby additionally will raise its rate of oxidation and thickening in the receptacle 1.

The bezel-like members 61 or 61 and 77 help to retain the material 20 in receptacle 1 and/or 62 and also substantially prevents the fluid 36, should it be therein in excess volume, from substantially being spilled, air ejected, or virtually dumped out when the motor vehicle is out of level; declining; reclining; abruptly starting, stopped or curving at a high rate of speed.

The ears or brackets 54 having openings 55 therein are shown in three places, but they may also be in four, five or six places on receptacle 1, as deemed necessary. Also the dashed line hangers 2, having a series (not shown) of holes 55', will serve to make the receptacle 1 adjustable as desired, to obtain the proper spaced relationship of the receptacle's 1 material 20 to the bottom of the oil pan sump 64, substantially as is shown in FIG. 2 and which adjustability of the receptacle 1 or material 20 is generally disclosed in copending application Ser. No. 532,831. The hangers 2 may also have opening 55' therein and the top of hanger 2 ends may also be straight up, as shown by the dashed lines, or the top formed over at an angle, as is generally shown in FIGS. 1 and 3 with as many holes 55' therein, as is deemed necessary.

FIG. 4 shows the location of exhaust pipe 79, heat 80 waves, dished down portion 76 of the top of bezel-like member 61, fluid 36, material 20, dashed line hangers 2 with dashed line opening 55' therein and general shape of ears 54 which may be 2' if extended to the top of hangers 2 as shown in dashed line outline in FIG. 1, for example. The vertical length of at least one or at least two hangers 2 may also be adjustable in a removably secured vertical overlapping adjacent relationship, for example, two vertical hangers 2 shown in FIG. 1. That is by taking the formed over 2' hanger 2 which is taken with at least one of the straight dashed line hanger 2, any desired combination of hangers 2 of the adjustable type may thereby be formed or constructed according as desired, or deemed necessary.

FIG. 5 shows a special corrugated or wave formed shaped 82 bottom wall of a crankcase oil pan sump 64 being in combination and against the surface of material 20, which is retained in receptacle 1, partially shown. The material 20 may also be retained in a partial dashed line showing of a trampoline 83 type of fluid 36 retaining structure or device, if desired. Thereby the oil 84 shown in FIG. 6 will not be overheated and the bearings in the crankcase will not be ruined when the motor vehicle is travelling at a high rate of speed on a highway or race track, for example, as previously disclosed in FIG. 2.

FIG. 5 further shows generated draft of air 49 arrows, into corrugated 82 openings 81 which are at least in the forward bottom wall portion of the sump 64 for cooling substantially the same area of the oil pan 64 sump's bottom wall to thereby or at least preventing the oil 84 film's breakdown and thereby creating the disclosed bearing seizure or disaster to the motor bearings (not shown).

When hydrocarbons, oxides of nitrogen and the like are emitted from the dripped fluid which is thereon a hot, sun-heated surface, or is exposed to the hot sunlight, a photochemical reaction produces irritants and haze. When these byproducts are retained in an area by climatic conditions or topographical barriers, the concentration of irritants can produce severe discomfort. The Los Angeles basin has all the necessary ingredients to produce such conditions about 100 days per year.

Hydrocarbon consuming or utilizing bacteria, being a catalyst means 46, which are preferred to be areobic and which utilize the described film or the hydrocarbons therein, for the primary purpose of gaining energy for their life processes in much the same way that higher animals utilize carbohydrates, fats and proteins. The bacteria are characterized by the ability to subsist upon various hydrocarbons as a sole source of organic matter in their diet. Hydrocarbons when utilized in this manner serve the identical purpose that they do when used in an internal combustion engine, the production of utilizable energy with which to do work. Specific catalysts are therein the bacteria and are also found in all living material. These naturally occurring catalysts are called enzymes. Enzymes are catalyst in exactly the same sense as are inorganic catalyst. Enzymes, like other catalyst, do not shift the equilibrium point of a reaction, but only hasten its attainment. The rate of enzyme-catalyzed reactions is approximately doubled for a 10° (centigrade) rise in temperature, but from an engineering standpoint, it is necessary to weigh this factor against the greater rate of destruction of enzymes at higher temperatures.

A catalyst means 46 material composed of tungsten, may also be used in and/or for the receptacle 1 and/or 62 as desired.

The porous and air permeable material 20 and/or the receptacle 1 having the disclosed bacteria, being an organic catalyst, and the material 20 or receptacle 1 may also have the disclosed inorganic catalyst means 46, as well as any granular material or a catalyst which is soluable in the retained fluid. A colloidal solid can be applied on the inside bottom wall portion of receptacle 1 and a catalyst for the retained fluid 36 is applied on the colloidal solid, which is not a catalyst carrier. A solution of copper and chromium nitrates can also be imbued in the colloidal solid. The colloidal solid can be microcrystalline of cellulose. Hard alumina (a catalyst) can be bonded to any portion on the receptacle 1 inside wall surface, and a metal catalyst, for said fluid, or combination of catalyst, for said fluid, in both oxide and halide form can be deposited on the catalyst, alumina base. Metals of colbalt, molybenum, platinum, palladium, ruthenium, iron, chromium, zinc, copper, chrome and the like can also be deposited on the alumina catalyst base. A synthetic silica-alumina catalyst in pellet form can also be used if desired. The alumina catalyst base can also be imbued with a solution of copper and chromium nitrates or pellets of alumina can also be imbued with the copper and chromium nitrates which are placed or imbued into a separate material retained in the receptacle 1 and/or 62 as desired.

Chromite catalyst prepared on an alumina or synthetic alumina base and bonded on an inside wall portion of the receptacle 1 may also be desireable. The retained fluid contracting the catalyst and a supply of a draughting flow of air which supplies atmospheric oxygen for the catalytic action, whereby the rate of oxidation and thickening of the retained fluid 36 is increased and the fluid volume is decreased. Unsupported catalyst such as copper chromite g-13 and barium-promoted copper chromite G-22 and the like may also be used for said fluid, and are found in tablet (cylindrical), pellet and the like form.

Catalyst for the oxidation of lubricating oils include a wide variety of compounds, some of which are metal catalyst such as compounds of copper, lead, iron, manganese, chromium, vanadium and the like and which may also be used for the retained fluid 36, accordingly. Napthenate of iron, copper, lead, silver and cadium can be placed or piped into the retained fluid, and are effective catalysts especially if the retained fluid is heated to a higher temperature. Exhaust gases range from about 150° F. to 1,500 F. and thereby the retained fluid can be heated, with use of exhaust tubing 79, for example, as is shown and disclosed in FIGS. 3 and 4 and to quite a high temperature, but safely short of the fluid's flash point, as desired or deemed necessary within safety margin, and also against smoke and fire formation and the like. A combination of copper, lead, and iron in bulk or soap form can also be contained in the material 20 and/or the receptacle 1 or 62 and the like for the retained fluid 36 receptacles. Compounds of manganese, mercury, chromium, calcium, vanadium, nickel and the like can also be used as a catalyst as well as sodium napthenate and calcium napthenate. Calcium oleate and manganese oleate can also be used as a catalyst means for the retained fluid. Oxidation of the retained oil is also accomplished by placing oleum into the receptacle 62 and/or 1 and the like receptacles. The catalytic oxidation of automotive exhausts, its known process, catalyst and catalyst carriers and the like are to be used herein and disclosed in this specification as a possible new use.

The insertion of Paratac directly into the receptacle 1 or 62 or material 20 therein or directly into the lubricating fluid will create a greater thickening effect of the dripping fluid or oil especially when the motor vehicular generated draft of air contacts the Paratac and fluid combination in the receptacle 1 and/or 62 and/or the material 20 retained therein.

Paratac is a trademark for a high molecular weight isobutylene polmer used as an additive for both lubricating oils and grease. Particularly applicable in producing the so-called "nondrip," "nonsplatter" oils. Paratac is, for example, manufactured by Enjay Mfg. Co. Paratac is well known to persons skilled in the fluid thickening art.

The insertion of Cab-O-Sil treated or untreated, into at least one portion of the receptacle 1 and/or 62 and/or insertion of or substantially imbueing of Cab-O-Sil, treated or untreated into material 20 will also increase the rate of thickening, especially if Paratac is also combined with the Cab-O-Sil accordingly, since Cab-O-Sil treated or untreated is also a fluid thickening agent made by the Cabot Corporation. Treated Cab-O-Sil is known as Silanox. Cab-O-Sil and Silanox are trademarks and are both manufactured by the Cabot Corporation. Cab-O-Sil is a colloidal pyrogenic silica pigment.

Also, the lubricating oil 84 in the improved sump 64, having the corrugated bottom wall 82 will generally prevent the oil 84, shown in FIG. 6, from climbing the side walls when making sharp turns at a high vehicle speed, especially if the side walls are also corrugated 82 (not shown).

FIG. 6 is taken along sectional line 6—6 of FIG. 5 and shows a trampoline 83 type of fluid 36 retaining device having material 20, oil pan sump 64 with generated draft of air shown substantially as 49 which air 49 is shown by the arrow means 49, showing in effect the air's 49, oil 84, cooling path by arrow means 49 into and against at least one corrugated portion of opening 81. All the oil 84 which is in contact with the inside wall portion of the sides and top wall of openings 81, is indirectly cooled by the motor vehicle's generated draft of air 49 which also additionally increases the rate of oxidation and thickening of the retained fluid 36, in material 20 which is also an air filter material, another step of the disclosed process. Of course, it should be understood that the oil pan sump's 64 bottom wall may be raised 60 at an angle at its forward portion, for example, and the rear drain plug portion 59 may be constructed far enough downward, as shown in this FIG. 6, so that the forward raised 60 portion is never embedded in material 20, thereby preserving the oil sump's 64 air 49 cooling requirement. Also a separate piece of stiffer material than is material 20, and if desired having a pocket or holes therein into which the 59 portion of the sump 64 is positioned or retained, thereby forcing material 20 away from the sump's 64 entire bottom wall, for said air 49 cooling thereof.

FIG. 7 shows a separate hole 80' perforated wall or corrugated formed material 86 under the oil pan sump's 64 bottom wall so that material 20 will be forced away therefrom, allowing passage of air 49 arrows to generally draft through the corrugated openings 87, against fluid 36 in material 20, through and against material 20, and against the sump's 64 bottom wall and substantially out and/or over the rear of material 86.

The trampoline device 83 is partially also shown. The fluid or oil 84 is shown having a generally "U" shaped water pipe 92, therein, which pipe 92 circulates water 93 from the vehicle's water cooling system, so that the fluid 84 will be additionally cooled, if so desired, but will be required if material 20 is insulatingly forced against the sump's 64 entire outside bottom wall, thereby blocking off the air 49 cooling means. The receptacle 1 is also partially shown. The corrugated material 86 may also be keyed into a depression by use of the raised surface 89, of the corrugated material 86, so that displacement of material 86 from the lubricating oil sump's 64 bottom wall is substantially prevented.

The term "summer icing" used in this specification is generally derived from the fact that light rain or drizzle, especially after a dry spell in the summer, produces a thin greasy film on the road surface, which is almost as slippery as ice. That is, especially during the first 15 to 30 minutes after it starts to rain and up to an hour or more in light drizzle. The deposited drizzle or rain at first tends to float on the high surface tension of, the roadway's or highway's surface which has the greasy film of oil or fluid drippings, or the centrifugally thrown out fluid from motor vehicles thereon.

The term "viscous hydroplaning" is one which may even be more dangerous than "dynamic hydroplaning"

which is generally on the surface of the rain or deposited rain water. Viscous hydroplaning may occur on a seemingly dry motor vehicle travelled highway surface, for example. The seemingly dry surface is no more than a heavy dew mingling with oil or fluid and dust on a well travelled highway which will create a greasy film of moisture that may be microscopically thin, but is sufficient to prevent tires from penetrating and finding safe traction. Flow of air 49 into the receptacle 1 and against and over the fluid 36 will increase the rate of oxidation and thickening of the fluid 36 therein, especially if catalyst, soil cultures, naturally occurring catalyst or enzymes, hydrocarbon-oxidizing bacteria, is inserted in receptacle 1 and/or material 20 therein. Soil or earth material 20 may be inserted into receptacle 1 and/or 62, and/or into a separate material 20, which is retained in receptacles 1 and/or 62, if desired accordingly.

The bed of catalyst or catalytic chemicals prevent the air from becoming polluted or contaminated by increasing the rate of oxidation and thickening of the otherwise centrifugally thrown-out and/or dripped fluid. If the fluid 36 coming or dripping from the crankcase, having gasoline therein was allowed to leak or drip and thereby forming a fluid mess or puddle or allowed to be spilled or dumped onto a hot sun heated surface and thereby be exposed to the hot sunlight, the emission of hydrocarbons therefrom would become noxious generally furthere polluting of the air and possibly irritating one's eyes by possible formation of some peroxybenzoyl nitrate.

A modified reduced version of the above disclosed apparatus structure may also be secured to and under a fluid dripping hydraulic mechanism, torque converted hydraulic line connection, gear box, power steering unit, and the like or any combination thereof.

It is also to be understood that all, one or any combination of the catalyst, material 6, 6a, 6d, 20, 117, 118, 119, 120 121 thickening agents, and the like disclosed in this specification and in copending applications Ser. Nos. 508,624; 530,217; and 532,831 may be used in this invention or in receptacle 1 and/or 62, as desired.

The draught of air, which is generated during motor vehicular drive, will flow over and generally at times through at least one portion of said material 20. The draught of air 49 will absorb or drive off the fumes which are or may be over the fluid; provide the fluid 36 with oxygen to accelerate fluid oxidation and create a draughty atmosphere through the material 20 whereby volatile fluids are accordingly removed, for reducing the volume and increasing the thickening or viscosity of the disclosed fluid 36 in the material 20 retained in receptacle 1 and/or 62.

The state and federal government is presently cleaning the motor vehicle travelled surfaces with surface scrubbing machines, surface cleaning machines or cleaning with detergents, soaps, and the like. The state alone is presently paying thousands of dollars to clean the thruway areas and toll collecting areas and thereby millions of dollars is saved for all concerned by use of the process and subcombination apparatus invention disclosed in this specification.

All matter is subject to loss due to evaporation and the rate of this loss is due to a function of the physical properties of the material or the retained fluid 36 and especially if the retained fluid is subjected to a drafting flow of hot arid air. The fluid retaining receptacles 1 and 62 also being subjected to a vibrating or agitating motion, as when it is secured under a motor vehicle, which is in forward drive motion over a roughly travelled motor vehicle surface and the like. The rate of oxidation and thickening of the retained fluid by the generated draft of air may be further increased by forming or adjusting the shape of the retained fluid receptacle 1 and/or 62, or by portions of receptacle 1 and/or the spacing of the top surface of material 20 to at least one portion of the motor vehicle's underside.

The fluid retaining receptacles 1 and 62 disclosed in this specification may also be fluid permeable or fluid impermeable, as accordingly deemed necessary. The receptacle 62 may be made of metal, plastic or as are new milk cartons which are made of paper or paperboard, and coated with polyethylene, especially the bezel-like 61 receptacle 62 shown in FIG. 11, for example, that could be made to be a disposable unit along with material 20 therein.

The latter portion of this specification contains further descriptive detailed materials, coatings apparatus receptacle and retaining means, coatings and the like which may be necessary for a more detailed specification. Fabrics which are woven and nonwoven are used for the outside, inside, or core of the fluid retaining receptacle 62 and are to be plastic or elastomer coated as desired or deemed necessary for creating fluid impermeability. Nylon that is coated with Buna N also makes a good barrier for the retained fluids 36. Elastomers such as natural rubber, SBR, Polyisoprene, Neoprene, Silicone, Hypalon, Polybutadiene, Butyl, Polyurethane, Nitrile, Polysulfide, Polyacrylate, Flourcarbon and the like are to be used as desired or deemed necessary for a coating, boot, sleeve, bag, coatings and the like, for the oil resistant or fluid impermeable receptacle 62 which are reusable or disposable and are with or without bezels 61 as is on receptacle 62. The elastomers or receptacle 62 may also have an open cell foam material 20 foamed therein if so desired, and loose or bonded fibers or hair, manmade metal, and the like and with oil resistant, elastomer or plastic material as a binder are also to be used as being material 20, and especially a material 20 having or is treated with Silanox.

Some of the fire retardent type, fluid absorbent and the like type as well as being an open-cell foam material is made from latex rubber Polyvinyl, polyether, urethane, polyurethane, chloride, polyester, polyepoxies, vinyl, phenolic, polyolefin, silicone, and the like which are or can be rigid or semi-rigid or flexible or super soft and used as desired or deemed necessary to thereby be a Silanox treated or untreated, as desired, material 20. Since glass fibers are the fastest growing and their applications are almost entirely industrial and are fluid resistant and heat resistant they are also preferred for being material 20. Other fibers which can be used are asbestos, sisal, cotton, jute, man-made and metallic fibers. The resin used are preferred to be polyesters but epoxies, phenolics and silicones are also to be considered for constructing the receptacle 62 as desired or deemed necessary.

A plastic film or sheet which is fluid impermeable may also be hand nested to thereby form receptacle 62 with material 20 therein, that is shown in dashed line outline. The material 20 is further preferred to be a Silanox-treated air permeable and fluid permeable, open-cell foam, fibrous, curly hair bonded material, also glass wool, man-made fiber which is loose, in batting form, or which is resin or elastomer (oil resistant) bonded together. The term "material" or "material means" will substantially designate all of or any desired combination of the materials disclosed and/or referenced in this specification, treated and/or untreated with Silanox, as desired.

Ninety percent of the urban Americans live in localities with polluted air, but only half of all these people are served by local air pollution control programs. It is unmistakably clear that air pollution is associated with important respiratory diseases, such as long cancer, emphysema, chronic bronchitis, and asthma, but progress or no program is effective if it is not backed by the public.

When hydrocarbons, oxides of nitorgen and the like are emitted from the dripped or centrifugally thrown out fluid which is on a hot, sun-heated surface, or is exposed to the hot sunlight, a photochemical reaction produces irritants and haze. When these by-products are retained in an area by climatic conditions or topographical barriers, the concentration of irritants can produce severe discomfort. The Los Angeles basin has all the necessary ingredients to produce such conditions about 100 days per year.

In this time period of ever-increasing vehicular drive and high-speed travelling, whereby an ever-increasing armount of vehicles are estimated 101,000,000 to be on the highways, thruways, freeways, turnpikes, streets, roads and the like, by 1972. This is an indicator to provide safer, cleaner and uncontaminated highway surfaces on which all persons in motor vehicles must travel, and this is the basis for this very needed process and apparatus or subcombination apparatus invention.

While several embodiments of this process and subcombination apparatus invention have been disclosed, it is understood that the inventive idea may be carried out in a number of ways. The above disclosed invention is, therefore, not limited to the precise details described, but it is intended to cover all variations and modifications falling within the scope of the appended claims.

The polygonal, rectangular, square, round troughy, triangular or other polygonal configurations of the receptacle 1 and/or 62 shape and the like are and will be apparent to those skilled in the art once this invention is disclosed of its importance and need thereof, by all, as mentioned in the forgoing specification or objects. The receptacle 1 and/or 62 are to have square, rounding, sharp, blunt and the like shaped corners which merge the rectilinear, curvilinear or other suitable band-like portions thereof into a fluid impermeable structure, as desired, by forming, coining, welding and the like.

The foregoing description and the drawings are given merely to explain and illustrate the invention and is not to be limited thereto, except insofar as the appended claims are so limited.

I claim:

1. A process for increasing the rate of oxidation and thickening and evaporation of fluid drippings from a motor vehicle while having said drippings substantially retained in a receptacle and in a material fluid retaining means for substantially retaining therein said drippings and even when substantially rain water accompanies said drippings, the steps comprising:
   a. catching and substantially retaining said drippings in said receptacle and said fluid retaining means which is retained in at least one portion of said receptacle; said receptacle being integral with at least one portion of a subcombination apparatus which is in an associated removably secured arrangement to at least one portion of said motor vehicle;
   b. arranging at least one portion of said apparatus so that at least one portion of a draft of air, which is generated by a forward drive motion of said vehicle, flows against at least one surface portion of at least one portion of said drippings.

2. The process of claim 1 including the additional step of guiding said air against said drippings to further increase the rate of oxidation and thickening and evaporation of said drippings.

3. The process of claim 1 including the additional step of substantially filtering vehicular traveled surface debris substantially out of said receptacle and said means to prevent obstruction of said air flow substantially against said fluid drippings to prevent further increasing rate of oxidation and thickening of said drippings.

4. The process of claim 1 including the additional step of additionally utilizing said draft of air over said means for also cooling at least one portion of substantially the lowest underside exposed wall surface of at least one oil pan of said vehicle; said apparatus is so constructed and arranged that an increased rate of temperature, oxidation and thickening of lubricating fluid in said pan is prevented.

5. The process of claim 1 including the additional step of additionally utilizing said air over said means for also cooling at least one lowest outer exposed wall surface portion of a crankcase oil pan sump, of said vehicle, for substantially preventing an increased rate of temperature, oxidation and thickening of lubricating fluid retained in said sump.

6. The process of claim 1 including the additional step of having said means in the form of at least one inorganic catalyzing means for further increasing the rate of oxidation and thickening of said drippings in said receptacle.

7. The process of claim 1 including the additional step of having at least one catalyzing means for further increasing the rate of oxidation and thickening of said drippings in said receptacle and retaining means by having said catalyzing means retained in at least one portion of said retaining means.

8. The process of claim 1 including the additional step of having at least one catalyzing means for further increasing the rate of oxidation and thickening of at least one portion of said drippings retained in a separate said retaining means which is inserted into at least one portion of the first said retaining means which is retained in said receptacle by having said catalyzing means retained in at least one portion of said separate said retaining means.

9. The process of claim 1 including the additional step of having organic catalyzing means for further increasing the rate of oxidation and thickening of said drippings retained in at least one portion of said retaining means by having said catalyzing means for said fluid retained in at least one portion of said retaining means.

10. The process of claim 1 including the additional step of having bacteria catalyzing means for further increasing the rate of oxidation and thickening and evaporation of said drippings by having said catalyzing means retained in at least one portion of said retaining means.

11. The process of claim 10 wherein said catalyzing means being aerobic bacteria which further increase the rate of oxidation and thickening and evaporation of said drippings means which are directly exposed to said draft of air.

12. The process of claim 11 wherein at least one portion of said bacteria is retained in Cab-O-Sil which is retained in at least one portion of said retaining means for further increasing the rate of oxidation and thickening of said drippings.

13. The process of claim 1 including the additional step of increasing the rate of thickeing of said drippings by having Paratac retained in said receptacle and said retaining means.

14. The process of claim 13 including the additional step of further increasing the rate of thickening of said drippings by having at least one portion of Cab-O-Sil retained in said Paratac, receptacle and said retaining means.

15. The process of claim 14 including the additional step of having at least one catalyzing means for further increasing the rate of thickening of said drippings in said retaining means by having said catalyzing means retained in said Paratac, receptacle and retaining means.

16. The process of claim 1 including the additional step by having said Paratac, Cab-O-Sil, and at least one catalyzing means for further increasing the rate of thickening of said drippings by having said Paratac, Cab-O-Sil and said catalyzing means retained in said receptacle and said retaining means.

17. The process of claim 1 including the additional step of having Paratac, Cab-O-Sil and at least one catalyzing means for further increasing the rate of oxidation and thickening and evaporation of said drippings by having said Paratac, Cab-O-Sil and said catalyzing means retained in said retaining means.

18. The process of claim 1 including the additional step of further increasing the rate of evaporation of at least one portion of water which is additionally retained in said receptacle and said retaining means.

19. The process of claim 1 including the additional step of further increasing the rate of thickening of said drippings by having Cab-O-Sil retained in at least one portion of said material.

20. The process of claim 1 including the additional step of having Cab-O-Sil as the said retaining means, which is retained in said receptacle, for further increasing the rate of thickening of said drippings.

21. The process of claim 19 including the additional step of having at least one forward half top surface portion of said receptacle in a substantially bezeled form to substantially prevent said Cab-O-Sil from being substantially forced out of said receptacle for preventing said drippings from being effectively further thickened by a loss of at least one portion of said Cab-O-Sil from said receptacle.

22. The process of claim 20 wherein at least one rear half top surface portion of said receptacle is also substantially bezeled for preventing still further loss of said Cab-O-Sil from said receptacle so that said drippings are more effectively further thickened in said receptacle.

23. The process of claim 22 including the additional step of having at least one inorganic catalyzing means for further increasing the rate of oxidation and thickening of drippings by having said catalyzing means imbued into at least one inside wall portion of said receptacle.

24. The process of claim 1 including the additional step of having at least one inorganic catalyzing means for further increasing the rate of oxidation and thickening of said fluid drippings by having said catalyzing means imbued into at least one portion of said retaining means.

25. The process of claim 1 including the additional step of having at least one inorganic catalyzing means for further increasing the rate of oxidation and thickening of said drippings by having said catalyzing means imbued into at least one inside wall portion of said receptacle.

26. The process of claim 1 including the additional step of having heat, from the exhaust system of a specific type of said vehicle, which travels on a roadway's or highway's surface, by convection be convected to at least one portion of said drippings for further increasing the rate of oxidation, thickening and evaporation of at least one portion of said drippings.

27. The process of claim 25 including the additional step of having at least one catalyzing means for further increasing the rate of oxidation, thickening and evaporation of said fluid drippings by having said catalyzing means retained in at least one portion of said retaining means.

28. The process of claim 25 including the additional step of having at least one inorganic catalyzing means for further increasing the rate of oxidation and thickening and evaporation of said drippings by having said catalyzing means imbued into at least one inside wall portion of said receptacle.

29. The process of claim 25 including the additional step of having catalyzing means for further increasing the rate of oxidation, thickening and evaporation of said drippings by having said catalyzing means retained in at least one portion of said retaining means.

30. The process of claim 29 including the additional step of having an inorganic catalyzing means for further increasing the rate of oxidation and thickening of said fluid drippings by having said inorganic catalyzing means retained in at least one portion of said receptacle.

31. The process of claim 1 including the additional step of further increasing the rate of thickening of said drippings by having at least one portion of a treated Cab-O-Sil retained in at least one portion of said material fluid retaining means.

32. The process of claim 31 wherein said treated Cab-O-Sil is composed of silane and fumed silicon dioxide called Silanox.

* * * * *